Dec. 23, 1947.     H. S. ALEXANDER     2,433,186
OPTICAL INSTRUMENT
Filed Dec. 29, 1945
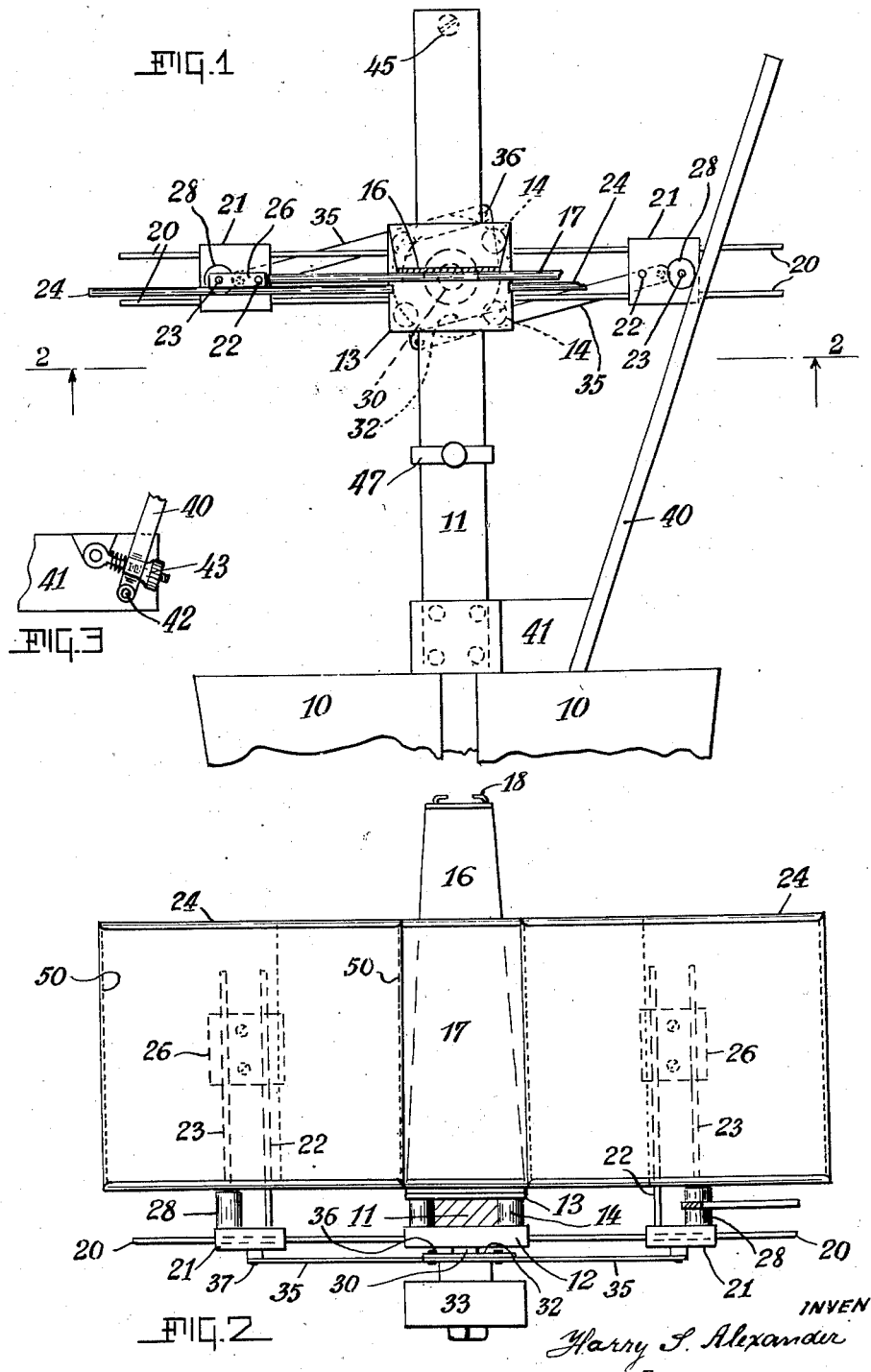
INVENTOR
Harry S. Alexander

Patented Dec. 23, 1947

2,433,186

UNITED STATES PATENT OFFICE 2,433,186

OPTICAL INSTRUMENT

Harry S. Alexander, Meadville, Pa., assignor to Keystone View Company, Meadville, Pa., a corporation of Pennsylvania Application December 29, 1945, Serial No. 638,229

1 Claim. (Cl. 128—76.5)

This invention relates to stereoscopic instruments for eye training of the type disclosed in my pending application filed April 3, 1945; Serial Number 586,294, now Patent Number 2,422,384. The instrument comprises a pair of complementary stereoscopic pictures which are mounted in what is known as a split slide holder. The latter is operated in the direction of the line of sight of the viewer from a far point to a near point position. The holders are also operated transversely of the line of sight, so that training in accommodation, longitudinal movement, and training in convergence, transverse movement, may be practised.

The object of the present invention is to provide an instrument in which the two movements may be accomplished separately or simultaneously at the will of the technician. The device is usually manufactured as an attachment to a standard stereoscopical instrument. The embodiment of the invention is shown in the accompanying drawing in which Fig. 1 is a plan view of the instrument with parts broken away and in section.

Fig. 2 is a transverse sectional view on the line 2—2 of Figure 1.

Fig. 3 shows a modification.

In the drawing a standard stereoscopic instrument is sufficiently indicated by the usual pair of binoculars 10, broken away, to which is secured a longitudinal central bar 11. Upon the latter is mounted a split slide holder unit comprising a bearing consisting of a base 12 and a top 13. These two members are secured together in spaced relation by bolts which carry anti-friction rollers 14. The latter engage the sides of the bar 11 as the attachment is moved along the bar which occupies the space between the members 12, 13 and the rollers 14 as shown in Fig. 2. To the top member 13 there is secured an upright support 16 for a background member 17 which extends transversely of the instrument. A lamp, not shown, may be attached to the top of the support 16 by means of bent lips 18. The bearing 12—13 carries on each side guide rods 20 which slidably support base blocks 21, 21, one on each side. The blocks 21 in turn carry upright rods 22, 23 which support the picture or slide holders 24, 24 with pictures as indicated in dotted lines at 50. The slide holders have bearings 26 for adjustable mounting upon the rods 22, 23. The outermost rod 23 on each side carries an antifriction roller 28.

To the central bearing 12—13 there is secured a shaft 30 which carries a crank disk 32 rotatable by a hand knob 33. The latter also serves as a means for moving the entire slide holder unit along the bar 11. Each slide holder base block 21 is connected to the crank disk by a link 35 which is pivoted to the disk and to the block at 36 and 37, respectively.

The device so far described may be operated to test for accommodation only by longitudinal movement of the slide holder unit. Or it may be operated to test for convergence only by rotation of the hand knob whereby to move the slide holders transversely by means of the crank disk and the links 35. Also, the unit may be moved along the bar 11 and at the same time the crank disk may be operated to space the pictures apart a distance proportional to the longitudinal position.

In order to afford the technician a convenient means of obtaining correct simultaneous accommodation and convergence the device is provided with an inclined guide or track 40 suitably affixed to a bracket 41 as shown and inclined outwardly with respect to the bar 11. If now the operator rotates the knob 33 in the far point position until the antifriction roller 28 on the track side of the device engages the track 40, Fig. 1, and thereafter moves the slide holder unit along the bar 11 and at the same time keeps rotating the knob 33 to maintain contact between the roller 28 and the track 40 simultaneous accommodation and convergence will be the result of such operation. If it at any time is desirable to space the pictures transversely without resort to the track, the operator may do so by suitable rotation of the knob 33 to disengage the roller 28 from the track 40.

The movement of the slide holder along the track is easily accomplished and requires no more effort than drawing a pencil along a straight edge. The operator will feel in his hand and can also observe directly whether the roller runs on the track. There are two rollers 28 because two tracks 40 may be found advantageous for a more steady movement. The track 40 may be pivoted on the bracket 41 as shown in Fig. 3 where the track may move about a pivot 42 and be adjusted angularly by adjusting means 43. A stop screw 45 is provided at the end of the bar 11 and an adjustable stop 47 may be provided to regulate the longitudinal movement of the slide holder.

I claim:

A device of the character described comprising a support which extends along the viewing direction, a slide holder unit on said support in lengthwise movable relation thereon, a pair of spaced picture holders carried by said slide holder unit and adapted to move therein transversely of said support, a mechanism for selectively moving said picture holders lengthwise and transversely on said support in one movement and for moving said picture holders transversely on said support independent of the lengthwise movement thereon, said mechanism comprising a crank disk carried by said unit, link members pivotally secured to said crank disk and said movable picture holders, an inclined track carried by said support, a guide roller on one of said picture holders and adapted to be moved manually along said track in operative contact therewith and a hand knob for rotating said crank disk.

HARRY S. ALEXANDER.

REFERENCES CITED

The following references are of record in the file of this patent:

UNITED STATES PATENTS

| Number | Name | Date |
| --- | --- | --- |
| 2,160,359 | Harper | May 30, 1939 |
| 2,203,069 | Woelfel | June 4, 1940 |
| 2,362,857 | Renshaw | Nov. 14, 1944 |